United States Patent [19]

Wilson, Jr. et al.

[11] 4,077,910

[45] Mar. 7, 1978

[54] HYDROCARBON CONVERSION OVER ACTIVATED ERIONITE

[75] Inventors: Robert C. Wilson, Jr., Woodbury, N.J.; Albert B. Schwartz, Philadelphia, Pa.

[73] Assignee: Mobil Oil Corporation, New York, N.Y.

[21] Appl. No.: 746,352

[22] Filed: Dec. 1, 1976

Related U.S. Application Data

[62] Division of Ser. No. 586,130, June 12, 1976, Pat. No. 4,021,332.

[51] Int. Cl.$^2$ .............................................. B01J 29/06
[52] U.S. Cl. .................................................. 252/455 Z
[58] Field of Search ..................................... 252/455 Z

[56] References Cited

U.S. PATENT DOCUMENTS

| 3,640,680 | 2/1972 | Kokotailo et al. | 252/455 Z |
| 3,687,839 | 8/1972 | Jenkins | 252/455 Z |

*Primary Examiner*—Carl F. Dees
*Attorney, Agent, or Firm*—Charles A. Huggett; Raymond W. Barclay; Claude E. Setliff

[57] ABSTRACT

This invention is directed to the shape selective conversion of a hydrocarbon charge over erionite which has been activated by the steps comprising calcining the erionite as a first step, contacting with a solution of an ammonium salt, contacting with a solution of metal salt containing a metal such as calcium, calcining again, contacting again with a solution of an ammonium salt and then with a solution of a metal salt containing nickel or another similar metal, and finally calcining. It is also directed to the catalyst utilized in affecting said conversion and to the method for preparing such catalyst.

14 Claims, No Drawings

HYDROCARBON CONVERSION OVER ACTIVATED ERIONITE

CROSS REFERENCE TO RELATED APPLICATIONS

This application is a division of copending application Ser. No. 586,130, filed June 12, 1975 now U.S. Pat. No. 4,021,332.

BACKGROUND OF THE INVENTION

1. Field of the Invention

The invention is concerned with hydrocarbon conversion processes. More particularly it is concerned with a specially activated erionite and its use in the shape selective conversion of a hydrocarbon charge.

2. Discussion of the Prior Art

It is well known in the prior art to crack a hydrocarbon charge by contacting it with a zeolite to which a hydrogenation catalyst has been added, either by impregnation or by ion exchange. For example, U.S. Pat. No. 3,379,640 relates generally to a shape selective hydrocarbon conversion process in which the zeolite must meet three critical criteria. These are that, first, it must have certain silicon to aluminum ratio, second, there must be no hydrogenation/dehydrogenation metals, etc. on the surface of the crystal and third, any hydrogenation/dehydrogenation component present therein must be within the interior of the crystal and be present to no greater extent than about 1.5 cations in a supercage of metals having hydrogenation/dehydrogenation activity.

U.S. Pat. No. 3,575,846 is concerned with a selective hydrocracking process accomplished in the presence of an erionite catalyst having a low potassium content and combined with a metallic hydrogenation component.

U.S. Pat. No. 3,474,025 discloses the use of a zeolite in shape selective hydrocarbon conversions, the zeolite containing no hydrogenating catalyst. The present catalyst must contain an active component.

SUMMARY OF THE INVENTION

In accordance with the invention there is provided an erionite catalyst prepared by the steps comprising: (1) calcining the natural erionite in a gas having a low partial pressure of water (i.e., about 200 torr or less) at from about 900° F to about 1500° F, preferably from about 1100° F to about 1300° F; (2) contacting said erionite at least once with the ammonium ion; (3) contacting with a polyvalent metal cation; (4) calcining as set forth in (1); (5) contacting with the ammonium ion as set forth in (2); (6) contacting with the $Ni^{++}$ ion such that at least about 2 wt. % of Ni expressed as NiO is present in said catalyst; and (7) calcining in air at about 800° F to about 1400° F, preferably about 900° F to about 1200° F. The invention also concerns the method outlined for preparing the erionite catalyst and a process for using it in the shape selective conversion of a hydrocarbon charge.

DESCRIPTION OF SPECIFIC EMBODIMENTS

Erionite per se is a naturally occuring zeolite having elliptical pore openings of about 4.7 to 5.2 Angstroms on its major axis.

The ability of erionite to selectively catalyze the conversion of straight-chain hydrocarbons in a hydrocarbon charge is surprisingly improved by following the procedure described herein. Available means for removing the natural cations (Na and/or K) in erionite include an exchange (which generally involves a series of exchanges) with a cation, such as the $NH_4^+$ cation, followed by a heating step to activate the zeolite.

In carrying out the process of the invention, conventional calcining means are used. As has been noted hereinbefore, the calcination of steps (1) and (4) is carried out in a gas having a low partial pressure of water. Such gas, which includes air, $N_2$, $CO_2$ and the like, must be used during calcination which is carried out by heating within the range of from about 5 minutes to about 10 hours, preferably about ½ to 2 hours, because a catalyst produced as provided herein except that calcining has been done in steam is substantially less stable than the air-calcined material. Also, it has been surprisingly found that calcining for the normal times of 1 to 1½ hours at temperatures of around 1000° F gives a catalyst which yields higher amounts of undesirable products and that catalyst activity and stability suffer at temperatures substantially higher than 1300° F.

"Contacting" as the term is used herein, generally means ion exchange with an aqueous solution containing the desired cation. It includes, however, impregnation of the zeolite with solutions of the desired cations.

The contacting procedures contemplated in connection with the present invention are conventional and flexible. The contact may be carried out by mixing an excess of the aqueous solution with the zeolite and maintaining contact therewith for from about 5 minutes to about 5 hours.

The rate of reaction can be increased by carrying it out at an elevated temperature. The temperature of the solution may however, be below the atmospheric boiling point of the solution or it may be higher as when such solution is under pressure. Suitably, contact may be carried out at temperatures of from about 60° F to reflux. The excess salt may be removed by washing.

Washing with water may be advantageous following steps (2), (5) and (6) as set forth hereinabove. It is preferred, for example, to use a wash following step (5) in order to increase the amount of nickel placed therein during step (6). When washing, sufficient water should be used to reduce the anion content to essentially nil. The concentration of anion is generally considered insignificant when its concentration is about 0.5% or less.

Any of the soluble compounds containing the desired cations may be employed in the contact procedure. Soluble salts, for example, may include the inorganic chloride, sulfate or nitrate salts as well as certain salts of organic acids, such as the acetate and formate salts.

With respect to the ammonium ion contacting steps (steps (2) and (5)) the preferred sources of the $NH_4^+$ ion are $NH_4Cl$ and $NH_4NO_3$. Contact times that may be used will range from about 5 minutes to about 5 hours at from about 60° F to reflux, and higher if pressure equipment is used. Preferably, contact time is from about 2 to about 4 hours at from 180° F to reflux.

The chloride, acetate and nitrate salts are preferred as sources of the polyvalent metal ions introduced in step (3) of the process as outlined under the "Summary". The calcium ion is preferred as the metal, and $CaCl_2$ and $Ca(NO_3)$ are the preferred compounds for supplying that ion. As has been suggested hereinbefore, metals of Group IB, IIA, IIB, IIIA, VIIB and VIII are useful in this step. These include, but are not limited to calcium, magnesium, copper, zinc, aluminum, manganese, cobalt and nickel ions. The preferred conditions for contacting are similar to those shown for step (2).

For step (6) of the process, the preferred nickel salt is nickel acetate (Ni (OAc)$_2$), but other salts may be used, e.g., the sulfate or nitrate. The preferred conditions for contacting are similar to those given in step (2).

The final calcination step (step (7)) is generally done at a lower temperature than the calcination of steps (1) and (4). For step (7), the preferred conditions include heating the product in air for about $\frac{1}{4}$ hour to about $1\frac{1}{2}$ hours at about 900° F to about 1200° F. Too low a temperature or too short a time will result in a high residual NH$_4^+$ content. Conversely, too high a temperature or too much time have a harmful effect on the catalytic properties.

The shape selective conversion of a hydrocarbon charge can be practiced either in conjunction with a reformer reactor or in a separate reactor to process full range reformate, light reformate, virgin stocks and other hydrocarbon streams. Therefore, the operating conditions employed in the process embodiments of this invention are selected such that, when used in a reformer reactor, the catalyst will be exposed to relatively typical reforming operating conditions including temperatures in the range of from about 850° F to about 1025° F, preferably from about 890° up to about 980° F, liquid hourly space-velocity in the range of from about 1.0 to about 60, preferably from about 2 to about 40, a pressure in the range of from about 50 psig up to about 700 psig and higher, preferably from about 100 to about 600 psig and a hydrogen to hydrocarbon ratio in the range of from about 2 to about 20, preferably from about 3 to about 10.

However, it is also within the scope of some embodiments of this invention to expose the catalyst in a separate reactor to a substantially wider range of operating conditions than is characteristic of a typical reforming operation. Therefore, the catalyst can encounter temperatures in the range of from about 500° to about 1025° F, or higher, pressures from about 50 psig up to as high as about 3000 psig, LHSV in the range of from about 0.5 to about 60 and a hydrogen to hydrocarbon ratio in the range of from about 0.5 to about 20.

The selective conversion relied upon in the contact step involving the catalyst was found to proceed under conditions of pressure and temperature which are regarded as either hydrogenative or aromatizing in the thermodynamic sense. Therefore, the operation may be effected at lower temperatures and higher pressure then in generally allowable in the normal reforming operation which is limited to the range of aromatizing conditions, that is for an equilibrium which favors aromatics in the reversible system, naphthenes $\rightleftarrows$ aromatics. In addition, the temperature of operation applicable to contact with the catalyst will depend on and be correlated to the acidity of the catalyst composition. That is, if it is prepared to contain much acidity internally, or is admixed with external acidic solid, operation at a relatively lower temperature can be achieved.

Having described the invention in general terms, the following is offered by way of illustration.

EXAMPLE 1

The erionite used in this and the remainder of the examples was obtained from Nevada and contained about 55-60% erionite, 20% clinoptilotite and the balance amorphous.

(1) Five hundred grams (ignited basis) of erionite was calcined in air for $1\frac{1}{2}$ hours in a 1200° F preheated muffle. It was then (2) contacted twice for 2 hours at reflux with 6 ml of 25 wt % NH$_4$Cl solution per gram of erionite and washed after the second exchange. The washed product was then (3) contacted for 2 hours at 180° F with 2 ml of 8.3 wt % Ca(NO$_3$)$_2$ solution per gram of erionite and was filtered. This filtered product was then (4) dried at 225°–250° F and calcined at 1200° F for $1\frac{1}{2}$ hours.

(5) The calcined product was contacted for 2 hours at reflux with 6 ml of 25 wt % NH$_4$Cl solution per gram of erionite and washed. Then (6) sufficient water was added to the wet cake to prepare a 30 wt % solids slurry, which was contacted for 4 hours at 210° F with 3.7 ml of 8.4 wt % Ni(OAc)$_2$ solution per gram of erionite. This was then washed and the washed product was (7) dried at 225°–250° F and calcined in air for $1\frac{1}{2}$ hours in a 1050° F preheated muffle.

EXAMPLE 2

This example is a commercial catalyst made by a procedure comparable with steps 2, 6 and 7 of Example 1.

EXAMPLE 3

1. Erionite was contacted with NH$_4$Cl solution and washed as per step 2, Example 1.
2. The filtered product was dried and calcined in air for $1\frac{1}{2}$ hours in a 1200° F preheated muffle.
3. The calcined product was contacted for 2 hours at reflux with 6 ml of 25 wt % NH$_4$Cl solution per gram of erionite and washed.
4. Step 2, above, was repeated.
5. Step 3, above, was repeated.
6. The filtered product was contacted with Ni(OAc)$_2$ solution and washed as per step 6, Example 1.
7. The washed product was dried and calcined as per step 7, Example 1.

EXAMPLE 4

A catalyst was prepared in the same manner as Example 1, except that the contact with a calcium salt solution (step 3) was omitted.

EXAMPLE 5

A catalyst was prepared in the same manner as Example 1, except that (1) the contact with a calcium salt solution (step 3) and (2) the contact with a nickel salt solution (step 6) were omitted. Thus, this catalyst is a H-erionite rather than a NiH-erionite.

EXAMPLE 6

A catalyst was prepared in the same manner as Example 1, except that the catalyst was washed after the contact with the calcium salt solution (step 3).

SCREENING TEST FOR EVALUATION OF SHAPE SELECTIVE CATALYSTS

A feed stock made up of a blend of 50% by weight of n-hexane and 50% by weight of isohexane (2-methylpentane) was fed for 1 hour over a catalyst bed such that the LHSV was 2.86. (The catalyst bed comprised 3.5 cc of granulated catalyst; the feed passed over it at about 10 ml per hour.) The pressure was 500 psig, the temperature was 900° F and hydrogen was flowing at the rate of 4 liters per minute measured at atmospheric pressure and 60° F.

COMMENTS

1. The results shown in the tables which follow are based on a chromatographic analysis of the reactor effluent.

2. n-$C_6$ Conversion, by weight (activity) was determined as follows:

$$\frac{50.0 - \% \text{ by weight n-}C_6 \text{ in effluent}}{50.0} \times 100$$

3. i-$C_6$ Conversion, by weight, was determined as follows:

$$\frac{50.0 - \% \text{ by weight total methylpentanes in effluent}}{50.0} \times 100$$

TABLE 1

| Example No. | 1 | 2 | 3 | 4 | 5 | 6 |
|---|---|---|---|---|---|---|
| Chemical Analysis, Wt. % | | | | | | |
| Ni, as NiO | 4.5 | 3.8 | 3.8 | 4.1 | — | 4.1 |
| K | 0.91 | 2.4 | 0.99 | 1.1 | 1.0 | 1.0 |
| Ca | 0.61 | 0.15 | 0.06 | 0.30 | 0.46 | 0.51 |
| Na | 0.24 | 0.23 | 0.09 | 0.18 | 0.22 | 0.23 |
| Mg | 0.33 | 0.18 | 0.20 | 0.35 | 0.39 | 0.34 |
| Fresh Catalyst | | | | | | |
| Screening Test [1] | | | | | | |
| n-$C_6$ Conversion, Wt.% | 71.3 | 58.4 | 73.6 | 74.0 | 80.4 | 73.4 |
| i-$C_6$ Conversion, Wt.% | 8.1 | 14.0 | 9.0 | 7.6 | 2.2 | 8.6 |
| Stability Test [2] | | | | | | |
| Screening Test [1] | | | | | | |
| n-$C_6$ Conversion, Wt.% | 62.9 | 35.0 | 56.4 | 59.0 | 35.4 | 59.2 |
| i-$C_6$ Conversion, Wt.% | 5.4 | 3.8 | 5.9 | 4.8 | 1.6 | 5.0 |
| Loss in Activity, % [3] | 21 | 51 | 38 | 34 | 73 | 32 |

[1] Presulfided with $H_2S$ prior to screening test
[2] Fresh catalyst heated for 3 hours in 1300° F preheated muffle with flowing wet air
[3] Based on log (1-fraction n-$C_6$ converted)

The significance of the sequence of the steps in the preferred procedure is shown in Table 1, which also includes data on a commercial catalyst (Example 2) for comparison. The data in Table 1 were obtained on the erionite component only (i.e., not extruded with any fillers or binders such as $Al_2O_3$). However, a preferred method of preparing the catalysts of this invention for commercial use includes the addition thereto of a binder such as $Al_2O_3$ and extrusion of the mix prior to the final calcination of step (7).

The catalyst of Example 3 was prepared by means of a double precalcination following the initial contact with $NH_4$. It is appreciably more active (n-$C_6$ conversion) and more stable than the Example 2 catalyst.

The catalyst of Example 4 was also prepared by means of a double precalcination, but in this case the first precalcination preceded the initial $NH_4$ contact. This catalyst has the same activity as the catalyst of Example 3 and is only slightly more stable. However, the procedure used in making the Example 4 catalyst has the economic advantage of eliminating a drying step, an $NH_4$ contact, and a water wash.

The catalyst of Example 5 was prepared by the same procedure as for the Example 4 erionite catalyst except that the contact with Ni was omitted (i.e., the Example 5 catalyst is a H-erionite rather than a NiH-erionite). A comparison of these two catalysts demonstrates dramatically the stabilizing influence of Ni.

The catalyst of Example 6 was prepared by the same procedure as was that of Example 4 except that a Ca contact and water wash were introduced immediately prior to the second calcination (step (4)). The differences between these two catalysts are negligible. However, when the water wash after the Ca contact is omitted, a further improvement in stability is obtained as shown by the catalyst of Example 1. The preparation of the catalyst of Example 1 illustrates the preferred procedure.

EXAMPLE 7

The method of Example 6 of Table 1 was used to prepare other materials for evaluating the effectiveness of several metals in stabilizing erionite. The test results are shown in Table 2. The data show that all of the metals result in a higher activity after the stability test. The results with Ca are outstanding and the results with Al, Mn, and Ni are good. Of particular significance is the fact that better stability is obtained despite removal of most or all of the introduced cation by the final contact with $NH_4$. Thus, it appears that the introduced cation is not fixed in the zeolite structure, but it is essential for it to be present during the subsequent calcination (step (4)).

TABLE 2

| Stabilizing Cation | $Cu^{++}$ | $Ca^{++}$ | $Zn^{++}$ | $Al^{+++}$ | $Mn^{++}$ | $Co^{++}$ | $Ni^{++}$ | None |
|---|---|---|---|---|---|---|---|---|
| Chemical Analysis, Wt. % | | | | | | | | |
| Ni, As NiO | 3.7 | 4.5 | 4.3 | 4.2 | 3.9 | 3.9 | 4.1 | 3.9 |
| K | 1.1 | 0.96 | 1.0 | 1.1 | 1.0 | 1.1 | 0.96 | 1.1 |
| Stabilizing Cation | 0.11 | 0.0[1] | 0.17 | 0.0[1] | 0.07 | 0.16 | 0.62[2] | — |
| Fresh Catalyst | | | | | | | | |
| Screening Test [3] | | | | | | | | |
| n-$C_6$ Conversion, Wt.% | — | 73.3 | 75.2 | 70.8 | 75.8 | — | — | 72.4 |
| i-$C_6$ Conversion, Wt.% | — | 8.0 | 10.2 | 11.2 | 7.8 | — | — | 9.4 |
| Stability Test [4] | | | | | | | | |
| Screening Test [3] | | | | | | | | |
| n-$C_6$ Conversion, Wt.% | 60.8 | 65.9 | 62.2 | 62.0 | 65.2 | 61.7 | 62.4 | 59.0 |
| i-$C_6$ Conversion, Wt.% | 4.6 | 5.4 | 4.8 | 6.2 | 4.2 | 4.3 | 4.0 | 5.0 |
| Loss in Activity, % [5] | — | 19 | 30 | 21 | 26 | — | — | 31 |

[1] Cation added by contact, i.e., the amount of stabilizing cation present in finished catalyst in excess of that present immediately prior to the contact.
[2] Ni prior to final $Ni(OAc)_2$ contact.
[3] Presulfided with $H_2S$ prior to screening test.
[4] Fresh catalyst heated for 3 hours in 1300° F preheated muffle with flowing wet air.
[5] Based on log (1-fraction n-$C_6$ converted).

The method used to make Example 6 was also used to evaluate the stabilizing effect of Ni. The contacts with the nickel salt solution in Examples 8, 9 and 10 were made with 0.1 molar, 0.5 molar and 0.75 molar solutions of nickel ion, respectively, followed by washing. The data in Table 3 show that a catalyst containing 1.5 wt. % Ni expressed as $NiO_2$ is significantly less stable than one containing 3.9 wt. % Ni expressed as $NiO_2$ and that higher NiO contents offer no advantages. Thus, the desired minimum NiO content is about 2 wt. % Ni expressed as $NiO_2$.

TABLE 3

| Example No. | 8 | 9 | 10 |
|---|---|---|---|
| Chemical Analysis, Wt. % | | | |
| Ni, as NiO | 1.5 | 3.9 | 5.6 |
| K | 0.89 | 0.90 | 0.89 |
| Ca | 0.35 | 0.34 | 0.35 |
| Na | 0.27 | 0.26 | 0.26 |
| Mg | 0.34 | 0.34 | 0.33 |
| Fresh Catalyst | | | |
| Screening Test [1] | | | |
| n-$C_6$ Conversion, Wt.% | — | 75.8 | — |
| i-$C_6$ Conversion, Wt.% | — | 9.2 | — |
| Stability Test [2] | | | |
| Screening Test [1] | | | |
| n-$C_6$ Conversion, Wt.% | 53.4 | 63.4 | 62.2 |
| i-$C_6$ Conversion, Wt.% | 3.0 | 5.6 | 6.4 |
| Loss in Activity, % [3] | — | 29 | — |

[1] Presulfided with $H_2S$ prior to screening test
[2] Fresh catalyst heated for 3 hours in 1300° F preheated muffle with flowing wet air
[3] Based on log (1-fraction n-$C_6$ converted)

We claim:

1. A crystalline aluminosilicate erionite zeolite catalyst prepared by the steps comprising (1) calcining erionite in a gas having a low partial pressure of water at from about 900° F to about 1500° F, (2) contacting at least once with ammonium ions, (3) contacting with cations of a polyvalent metal, (4) calcining as set forth in (1), (5) contacting with ammonium ions, (6) contacting with nickel cations and (7) calcining in a gas as defined in (1) at from about 800° F to about 1400° F.

2. The catalyst of claim 1 in which the metal introduced in step (3) is calcium.

3. The catalyst of claim 1 in which the nickel, expressed as NiO, is present in such catalyst in the amount of at least about 2% by weight thereof.

4. The catalyst of claim 1 in which the temperature in steps (1) and (4) is about 1100° F to about 1300° F.

5. The catalyst of claim 1 in which the temperature in step (7) is about 900° F to about 1200° F.

6. The catalyst of claim 1 in which the contact in steps (2) and (5) will last from about 5 minutes to about 5 hours at temperatures from about 60° F to reflux.

7. The catalyst of claim 1 in which the source of nickel in step (6) is nickel acetate.

8. A method for preparing a crystalline aluminosilicate erionite zeolite catalyst comprising the steps (1) calcining erionite in a gas having a low partial pressure of water at from about 900° F to about 1500° F, (2) contacting at least once with ammonium ions, (3) contacting with cations of a polyvalent metal, (4) calcining as set forth in (1), (5) contacting with ammonium ions, (6) contacting with nickel cations, and (7) calcining in a gas as defined in (1) at from about 800° F to about 1400° F.

9. The method of claim 8 in which the metal introduced in step (3) is calcium.

10. The method of claim 8 in which the nickel, expressed as NiO, is present in such catalyst in the amount of at least about 2% by weight thereof.

11. The method of claim 8 in which the temperature in steps (1) and (4) is about 1100° F to about 1300° F.

12. The method of claim 8 in which the temperature in step (7) is about 900° F to about 1200° F.

13. The method of claim 8 in which the contact in steps (2) and (5) will last from about 5 minutes to about 5 hours at temperatures from about 60° F to reflux.

14. The method of claim 8 in which the source of nickel in step (6) is nickel acetate.

* * * * *